*Inventors:*
KARL HORSTMANN
ANDRÉS SANTIAGO-FERNANDEZ
FRIEDRICH BOYSEN
BY *Karl F. Ross*

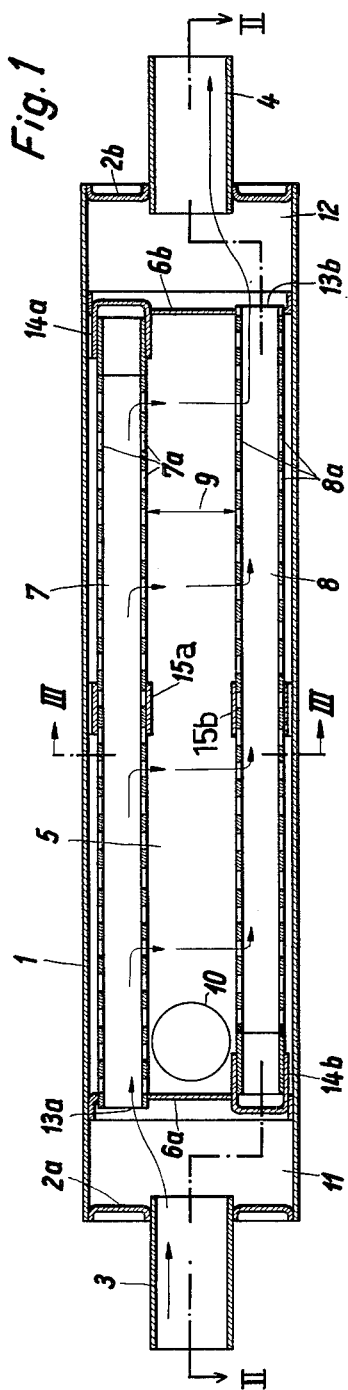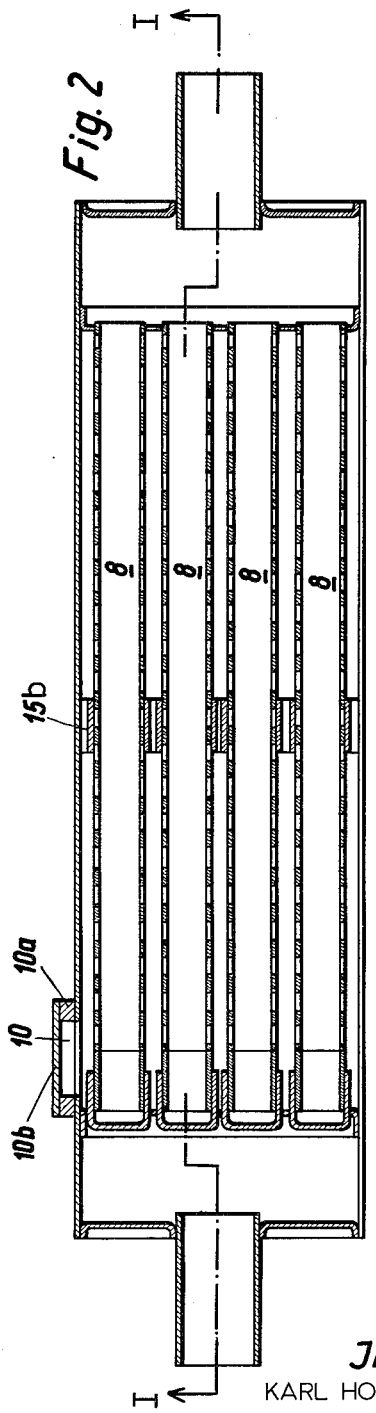

KARL HORSTMANN
ANDRÉS SANTIAGO-FERNANDEZ
FRIEDRICH BOYSEN
*Inventors.*

Nov. 2, 1965 K. HORSTMANN ETAL 3,215,507
CATALYTIC AFTERBURNER FOR COMBUSTIBLE INGREDIENTS OF
THE EXHAUST GASES FROM INTERNAL-COMBUSTION ENGINES
Filed Feb. 6, 1962 4 Sheets-Sheet 4
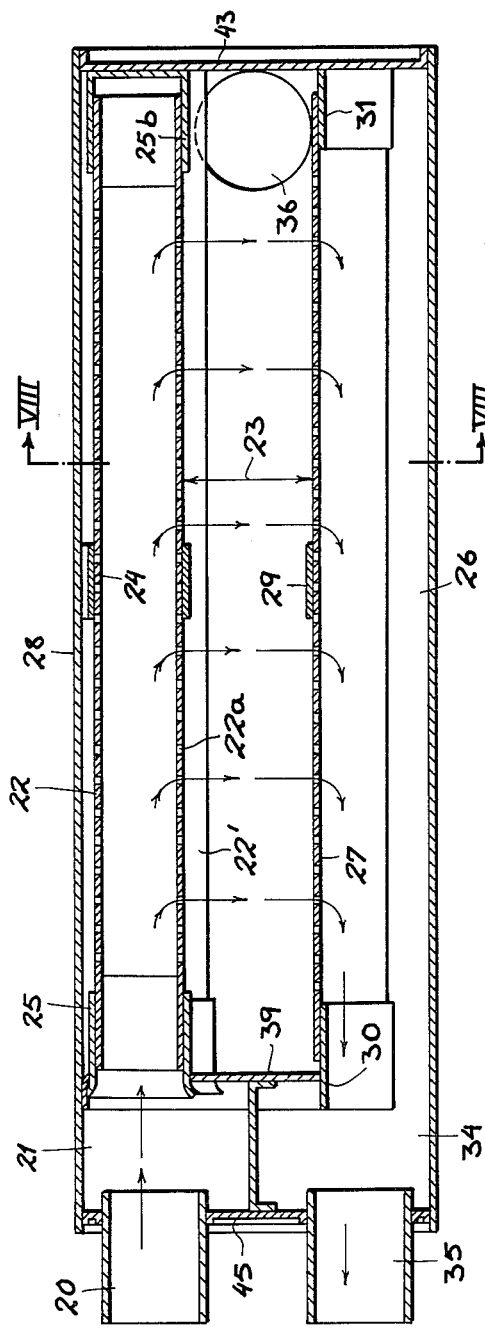
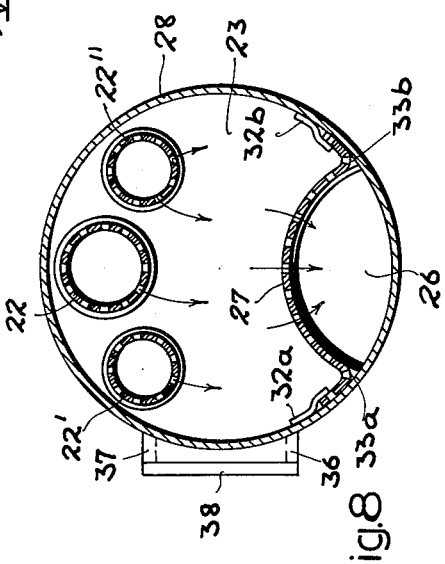
Karl Horstmann
Andrés Santiago-Fernandez
Friedrich Boysen
INVENTORS.
BY
Karl F. Ross
AGENT _United States Patent Office_

3,215,507
Patented Nov. 2, 1965

3,215,507
CATALYTIC AFTERBURNER FOR COMBUSTIBLE INGREDIENTS OF THE EXHAUST GASES FROM INTERNAL-COMBUSTION ENGINES
Karl Horstmann and Andrés Santiago-Fernandez, Altensteig, Black Forest, and Friedrich Boysen, Am Sonnenweg 29, Stuttgart-Heumaden, Germany; said Horstmann and said Santiago-Fernandez assignors to said Boysen
Filed Feb. 6, 1962, Ser. No. 171,455
Claims priority, application Germany, Feb. 7, 1961,
B 61,157
9 Claims. (Cl. 23—288)

Our present invention relates to a device for catalytically burning residual combustible ingredients of the exhaust gases from internal-combustion engines.

An object of the present invention is to provide a catalytic afterburner for the purpose referred to which is of compact construction and can be easily manufactured from materials capable of withstanding operating temperatures of 1000° C. and above.

Another object of our invention is to provide a burner of this type which insures intimate interaction between the incompletely combusted exhaust gases and a conventional combustion catalyst disposed in their path.

A further object of the invention is to provide an afterburner of the character set forth which can be readily combined with or built into a muffler for automotive vehicles.

It is also an object of this invention to provide a burner construction which satisfies the need for a certain relative mobility of its parts to accommodate thermal dimensional changes.

An afterburner according to this invention, designed to realize the foregoing objects, comprises an elongated tubular housing traversed in longitudinal direction by one or more gas-inlet ducts and one or more gas-outlet ducts transversely spaced from one another, the intervening space being occupied by a catalytic mass through which the waste gases escaping from lateral perforations of the inlet duct or ducts pass into similar perforations of the outlet duct or ducts.

The tubular housing can be conveniently designed as a muffler insertable in the tail pipes of automotive vehicles and, for this purpose, is advantageously provided with an entrance port at one end and an exit port at the other; the two ports could, however, also be located on the same side.

The gas-conducting passages, or at least some of them, need not be complete tubes but may be constituted by curved or angularly bent shell segments bearing upon the peripheral housing wall to form longitudinal channels therealong.

Generally, each duct will be open at one end and closed at the other, the gases entering at the open ends of the inlet ducts and leaving at the open ends of the outlet ducts. If the open ends of the two sets of ducts are disposed at opposite extremities of the housing, the catalytic mass may be confined between a pair of partitions which form at one housing extremity a distributing chamber in communication with the inlet ducts and at the other housing extremity a collecting chamber in communication with the outlet ducts. It is, however, also possible to have all the ducts terminate with their open ends at the same side of a catalyst chamber within the housing and to partition the housing portion adjacent such chamber longitudinally into a distributing compartment and a collecting compartment.

It is desirable, pursuant to a further feature of our invention, to mount each duct along only one zone of limited axial extent on the housing body so that the duct may freely expand and retract under changing temperatures. Thus the duct may be rigidly held at one end and slidably supported at the other, preferably with one or more intermediate sliding supports along its length; it may, however, also be fixedly engaged at one intermediate point and have both ends slidable in suitable bearing sleeves.

The catalytic agent, e.g. a coating of platinum black or cobalt oxide on a mass of ceramic fibers or granules, can be introduced into the burner housing through one or more openings that are closed by suitable lids during operation. The invention is applicable to any type of internal-combustion engine including gasoline (e.g. of the two-cycle or four-cycle type) and diesel motors.

The invention will be described hereafter in greater detail with reference to the accompanying drawing in which:

FIG. 1 shows in longitudinal sectional elevation, taken on the line I—I of FIG. 2, a combination of muffler and afterburner embodying the invention;

FIG. 2 is a sectional view taken on the line II—II of FIG. 1;

FIG. 7 is a longitudinal sectional view similar to FIG. 1, showing another embodiment;

FIG. 8 is a cross-sectional view taken on line VIII—VIII of FIG. 7; and

Figure 3:
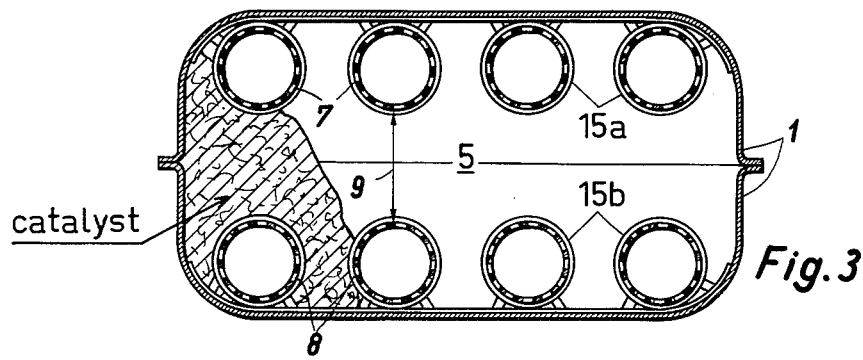
FIG. 3 is a cross-sectional view on the line III—III of FIG. 1.

The afterburner shown in FIGS. 1–3 comprises a tubular housing 1 with axially extending nipples 3 and 4 forming entrance and exit ports by which it may be inserted as a muffler in the tail pipe of an automotive vehicle not shown. Exhaust gases from the engine of the vehicle, suitably enriched with oxygen if necessary, enter through port 3 and leave at port 4 after a combustion of their residual fuel components within the closing 1. These ports are centrally inserted in the end walls $2^a$ and $2^b$ of the muffler housing.

The interior of housing 1 forms a central chamber 5 for a catalytic mass which can be introduced through a lateral aperture 10 framed by a flange $10^a$, this loading aperture being normally closed by a lid $10^b$ secured to the flange $10^a$ by suitable means not shown. The central or principal chamber 5 is bounded by transverse partitions $6^a$ and $6^b$ which form a pair of end chambers, i.e., a distributing chamber 11 and a collecting chamber 12, between themselves and the housing walls $2^a$ and $2^b$, respectively. A set of four inlet ducts 7 and four outlet ducts 8 coextensive with one another traverse the chamber 5 and communicate with it through peripheral openings $7^a$ and $8^a$, respectively, the transverse separation of these inlet and outlet ducts being indicated by the arrow 9 in FIG. 3. The inlet ducts 7 are open at one end $13^a$ toward the distributing chamber 11, this end being fixedly secured to the partition $6^a$, and are slidable at their opposite ends in a closure cap $14^a$ carried by partition $6^b$. By an analogous but inverted arrangement, the outlet ducts 8 have their open ends $13^b$ communicating with the collecting chamber 12 and fixedly secured to the partition $6^b$, their opposite ends being slidable in a closure cap $14^b$ rigid with partition $6^a$. The two sets of ducts are additionally slidable in bearing sleeves $15^a$, $15^b$ at the midpoint of their length, the sleeves being fixedly secured to the wall of housing 1.

As best seen in FIG. 3, housing 1 is of generally rectangular cross-section with rounded corners, the two sets of ducts 7 and 8 forming horizontal areas adjacent and parallel to the major sides of the rectangle. It will be apparent that the gases exiting from ducts 7 through their perforations 7ª must traverse the catalytic mass in reaction chamber 5 before being able to enter the perforations 8ª of ducts 8 on their way to the exhaust port 4.

Figure 4:
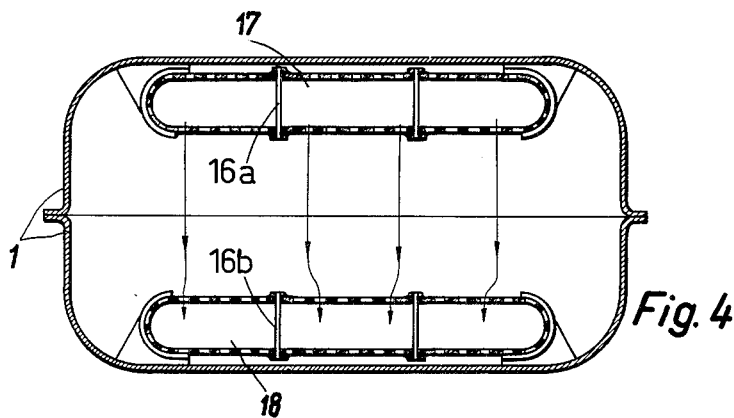
FIGS. 4, 5 and 6 are cross-sectional views similar to FIG. 3 but showing modified burners according to the invention.

In the modification of FIG. 4 the sets of inlet and outlet ducts 7 and 8 of the preceding embodiment have been replaced by single conduits constituted by horizontally flattened tubes 17 and 18, respectively. The configuration of the tubes 17 and 18 is maintained by transverse bolts 16ª and 16ᵇ.

Figure 5:
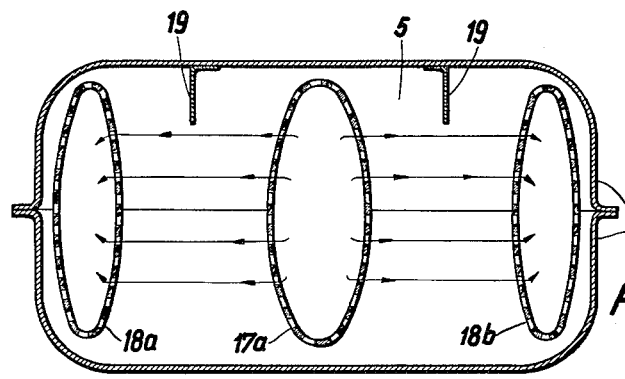

FIG. 5 shows a further modification wherein the ducts within housing 1 are represented by a single, centrally disposed inlet tube 17ª and two outlet tubes 18ª, 18ᵇ flanking the tube 17ª. It will be noted that tube 17ª is wider than the other two so that the inlet and outlet channels have substantially the same overall cross-sectional area.

Inasmuch as during prolonged operation the catalytic mass may tend to settle toward the bottom of the housing 1, voids may occurs near the top of chamber 5 so that gases passing in this region from duct 17ª to ducts 18ª, 18ᵇ might have only limited or substantially no contact with the catalyst. In order to avoid this possibility, we prefer to position a pair of longitudinally extending depending guard strips 19 between these ducts so as to force the gas streams to circulate well within the catalytic mass.

Figure 6:
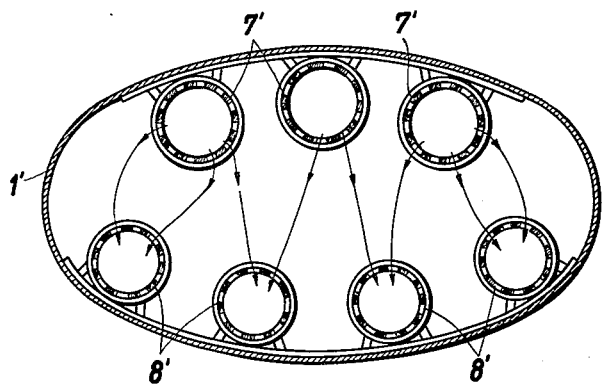

In the embodiment of FIG. 6 the housing 1' is of generally elliptical cross-section and contains three relatively wide inlet ducts 7' facing four relatively narrow outlet ducts 8', the total cross-sectional areas of the two sets of ducts being again substantially identical.

Figure 9:
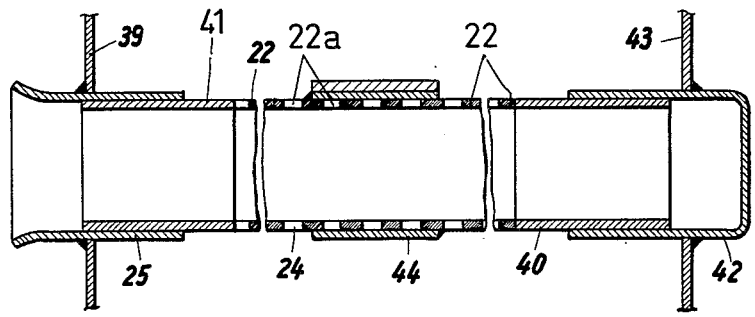
FIG. 9 is an enlarged fragmentary view, in axial section, of one of the ducts visible in FIG. 7, with minor modifications.

In the modification of FIGS. 7–9 there is provided a housing 28 of circular cross-section, having an end wall 45 with inlet and outlet ports 20 and 35, a flanged partition 39 closely spaced from wall 45 and defining therewith a distributing chamber 21 and a collecting chamber 34, and another end wall 43 remote from the partition 39.

A large center tube 22 and two similar lateral tubes 22', 22", extending along the upper inner wall surface of the housing 28, form the inlet ducts of the burner and are provided with wall openings 22ª for the escape of the waste gases into the catalyst space 23. A single outlet duct 26 of a cross-sectional area substantially equal to the combined area of ducts 22, 22' and 22" is formed by a cylindrical shell segment 27 subtending a portion of the lower wall surface of the housing 28 in contact therewith. A loading aperture 36 is framed by a flange 37 having a lid 38.

The shell segment 27 is centrally fixed to the housing 28 by a stirrup 29 and is provided with longitudinally extending ledges 33ª, 33ᵇ which are slidably guided by substantially coextensive rails 32ª and 32ᵇ rigid with the housing wall. A ring segment 30 on partition 39 and a similar ring segment 31 on end wall 43 form further sliding supports for the extremities of segment 27.

As more clearly seen in FIG. 9, the inlet tube 22 (as also each tube 22' and 22") is perforated at 22ª over the major part of its length and terminates in a pair of unperforated extremities 40 and 41. Tube 22 is fixedly secured at 24 to a sleeve 44 rigid with the housing and has its end 41 slidably received in a funnel 25 which is open toward the distributing compartment 21 and is firmly lodged within partition 39; the opposite end 40 of this tube is slidable in a closure cap 42 fixedly mounted in the end wall 43 (FIG. 9) or on that wall (FIG. 7).

It will be evident that we have disclosed an improved afterburner which can be conveniently designed to afford a sufficiently long residence period for the gases in the catalytic mass to insure substantially complete combustion. It will also be understood that the structures shown in the drawing can be easily assembled from prefabricated components, e.g. by axial introduction of the tubes 7, 8 with their partitions 6ª, 6ᵇ and their intermediate supports 15ª, 15ᵇ into the muffler housing 1, upon removal of either or both end walls 2ª or 2ᵇ thereof, preparatorily to being secured to the inner housing wall by welding or other appropriate means.

It will further be seen that in all disclosed embodiments, whether the tubular conduit means thereof include a single inlet duct and a single outlet duct (as in FIG. 4) or a plurality of such inlet and/or outlet ducts, the perforations thereof are always substantially evenly distributed over the length and width of the catalyst-filled reaction chamber and that the gas paths extending between these perforations are of approximately uniform length.

Departures from the precise configuration described and illustrated are, of course, possible within the scope of the invention as defined in the appended claims.

We claim:

1. A catalytic afterburner for exhaust gases from internal-combustion engines, comprising a tubular housing, partition means in said housing forming therein an elongated reaction chamber, first conduit means consisting of at least one tubular inlet duct closed at one end and extending in axial direction through said chamber, second conduit means consisting of at least one outlet duct closed at one end and extending in axial direction through said chamber in transversely spaced relationship with said first conduit means, and a catalytic mass completely filling said chamber externally of said first and second conduit means, said first and second conduit means being provided along confronting surfaces thereof with peripheral perforations which are substantially evenly distributed over the length and width of said chamber and which form paths of approximately uniform length through said mass for gases entering said chamber through said first conduit means and leaving said chamber through said second conduit means.

2. An afterburner according to claim 1 wherein said housing is of generally rectangular cross-section, said inlet and outlet ducts being respectively constituted by a pair of flattened tubes extending adjacent the major sides of the rectangle.

3. An afterburner according to claim 1 wherein said one of said conduit means comprises an elongated shell segment subtending a longitudinal wall portion of said housing in contact with said segment and defining therewith a longitudinally extending channel.

4. An afterburner according to claim 1 wherein one of said conduit means comprises a single duct extending along the axis of said housing, the other of said conduit means comprising a pair of ducts of lesser cross-section flanking said single duct.

5. An afterburner as defined in claim 1 wherein said housing further includes a distributing chamber and a collecting chamber formed therein by said partition means, said distributing chamber being provided with an entrance port for said gases, said collecting chamber being provided with an exit port for said gases, said inlet and outlet ducts having open ends respectively communicating with said distributing and collecting chambers.

6. An afterburner according to claim 5 wherein said partition means includes a transverse wall within said housing at one end of said reaction chamber, said housing having an end wall containing said ports and defining with said transverse wall a compartment substantially smaller than said reaction chamber, said partition means further including a divider extending axially within said compartment and bisecting same between said parts to form said distributing and collecting chambers.

7. A catalytic afterburner for exhaust gases from internal-combustion engines, comprising a horizontal tubular housing with an upper and a lower wall, partition means in said housing defining with said walls an elongated reaction chamber of greater width than length, a horizontal array of circularly cylindrical inlet ducts closed at one end and extending in axial direction through said chamber along one of said walls, a horizontal array of circularly cylindrical outlet ducts closed at one end and extending in axial direction through said chamber along the other of said walls in vertically spaced relationship with said inlet ducts, and a catalytic mass completely filling said chamber externally of said ducts, said inlet and outlet ducts being provided along confronting surfaces thereof with peripheral perforations which are substantially evenly distributed over the length and width of said chamber and which form generally vertical paths of approximately uniform length through said mass for gases entering said chamber through said inlet ducts and leaving said chamber through said outlet ducts.

8. An afterburner as defined in claim 7 wherein said housing further includes a distributing chamber and a collecting chamber formed therein by said partition means, said distributing chamber being provided with an entrance port for said gases, said collecting chamber being provided with an exit port for said gases, said inlet and outlet ducts having open ends respectively communicating with said distributing and collecting chambers.

9. An afterburner according to claim 8 wherein said distributing and collecting chambers are disposed on opposite sides of said reaction chamber.

References Cited by the Examiner

UNITED STATES PATENTS

| | | |
|---|---|---|
| 1,931,989 | 10/33 | Jenness. |
| 2,747,976 | 5/56 | Houdry. |
| 2,787,119 | 4/57 | Giambruno. |
| 2,909,415 | 10/59 | Houdry. |
| 2,928,492 | 3/60 | Nelson. |
| 3,024,593 | 3/62 | Houdry. |
| 3,041,149 | 6/62 | Houdry. |

FOREIGN PATENTS

| | | |
|---|---|---|
| 911,490 | 5/54 | Germany. |

MORRIS O. WOLK, *Primary Examiner.*

GEORGE D. MITCHELL, *Examiner.*